US010865513B2

(12) United States Patent
Kim et al.

(10) Patent No.: US 10,865,513 B2
(45) Date of Patent: Dec. 15, 2020

(54) WASHING MACHINE AND HOME APPLIANCE

(71) Applicant: Samsung Electronics Co., Ltd., Suwon-si (KR)

(72) Inventors: Jae Sin Kim, Suwon-si (KR); Wan Gi Park, Suwon-si (KR); Kab Jin Jun, Seongnam-si (KR); Jung Hwan Kim, Seongnam-si (KR); Dong Ik Lee, Suwon-si (KR); Ji Hoon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 16/068,223

(22) PCT Filed: Dec. 27, 2016

(86) PCT No.: PCT/KR2016/015334
§ 371 (c)(1),
(2) Date: Jul. 5, 2018

(87) PCT Pub. No.: WO2017/119655
PCT Pub. Date: Jul. 13, 2017

(65) Prior Publication Data
US 2019/0032270 A1    Jan. 31, 2019

(30) Foreign Application Priority Data

Jan. 5, 2016   (KR) .................. 10-2016-0000790

(51) Int. Cl.
*D06F 39/14*   (2006.01)
*D06F 37/28*   (2006.01)
(Continued)

(52) U.S. Cl.
CPC .............. *D06F 39/14* (2013.01); *A47K 13/30* (2013.01); *D06F 1/04* (2013.01); *D06F 23/04* (2013.01);
(Continued)

(58) Field of Classification Search
CPC .......... D06F 23/04; D06F 37/18; D06F 37/24; D06F 37/28; D06F 37/42; D06F 39/14; E05D 11/08; E05Y 2900/312
See application file for complete search history.

(56) References Cited

U.S. PATENT DOCUMENTS

2005/0072194 A1*  4/2005  Ryohke ................. D06F 19/00
                                                        68/3 R
2011/0050059 A1   3/2011  Kim et al.
(Continued)

FOREIGN PATENT DOCUMENTS

CN        202466211      10/2012
CN        105189847 B    12/2015
(Continued)

OTHER PUBLICATIONS

Australian Notice of Acceptance dated Mar. 22, 2019 in Australian Patent Application No. 2016385300.
(Continued)

*Primary Examiner* — Joseph L. Perrin
(74) *Attorney, Agent, or Firm* — Staas and Halsey

(57) ABSTRACT

Disclosed is a washing machine and a home appliance including a plurality of doors, a damper configured to buffer pivoting of the plurality of doors, and a structure by which each of the plurality of doors smoothly opened/shut.

17 Claims, 16 Drawing Sheets

(51) Int. Cl.
  *D06F 37/42* (2006.01)
  *D06F 37/18* (2006.01)
  *D06F 37/24* (2006.01)
  *D06F 23/04* (2006.01)
  *F25D 23/02* (2006.01)
  *A47K 13/30* (2006.01)
  *D06F 1/04* (2006.01)
  *D06F 39/08* (2006.01)
  *D06F 35/00* (2006.01)
  *E05D 11/08* (2006.01)

(52) U.S. Cl.
  CPC .............. *D06F 35/00* (2013.01); *D06F 37/18* (2013.01); *D06F 37/24* (2013.01); *D06F 37/28* (2013.01); *D06F 37/42* (2013.01); *D06F 39/088* (2013.01); *E05D 11/08* (2013.01); *F25D 23/02* (2013.01); *E05Y 2900/312* (2013.01)

(56) References Cited

U.S. PATENT DOCUMENTS

| | | | | |
|---|---|---|---|---|
| 2011/0062837 A1* | 3/2011 | Kim | ........................ | D06F 23/04 312/228 |
| 2014/0116097 A1* | 5/2014 | Park | ........................ | D06F 39/14 68/196 |
| 2014/0125210 A1* | 5/2014 | Park | ........................ | D06F 39/14 312/319.1 |
| 2015/0008808 A1* | 1/2015 | Kim | ........................ | D06F 39/14 312/228 |
| 2015/0035298 A1 | 2/2015 | Yokoo | | |
| 2015/0252508 A1* | 9/2015 | Kim | ........................ | D06F 39/12 68/27 |
| 2017/0130502 A1* | 5/2017 | Collene | ..................... | E05F 3/10 |

FOREIGN PATENT DOCUMENTS

| | | | | |
|---|---|---|---|---|
| JP | 2003-310521 | | 11/2003 | |
| JP | 2011143040 A | * | 7/2011 | ............. D06F 39/14 |
| KR | 10-2006-0048632 | | 5/2006 | |
| KR | 10-2006-0110812 | | 10/2006 | |
| KR | 10-2011-0046237 | | 5/2011 | |
| KR | 10-2015-0100580 | | 9/2015 | |

OTHER PUBLICATIONS

International Search Report dated Mar. 28, 2017 in International Patent Application No. PCT/KR2016/015334.
Written Opinion of the International Searching Authority dated Mar. 28, 2017 in International Patent Application No. PCT/KR2016/015334.
Australian Office Action dated Aug. 24, 2018 in Australian Patent Application No. 2016385300.
Extended European Search Report dated Aug. 8, 2018 in European Patent Application No. 16884038.7.
Australian Office Action dated Dec. 24, 2018 in Australian Patent Application No. 2016385300.
Indian Office Action dated Feb. 28, 2020, in corresponding International Patent Application No. 201817029300.
Chinese Office Action dated May 19, 2020, in corresponding Chinese Patent Application No. 201680069699.4.

* cited by examiner

[Fig. 1]
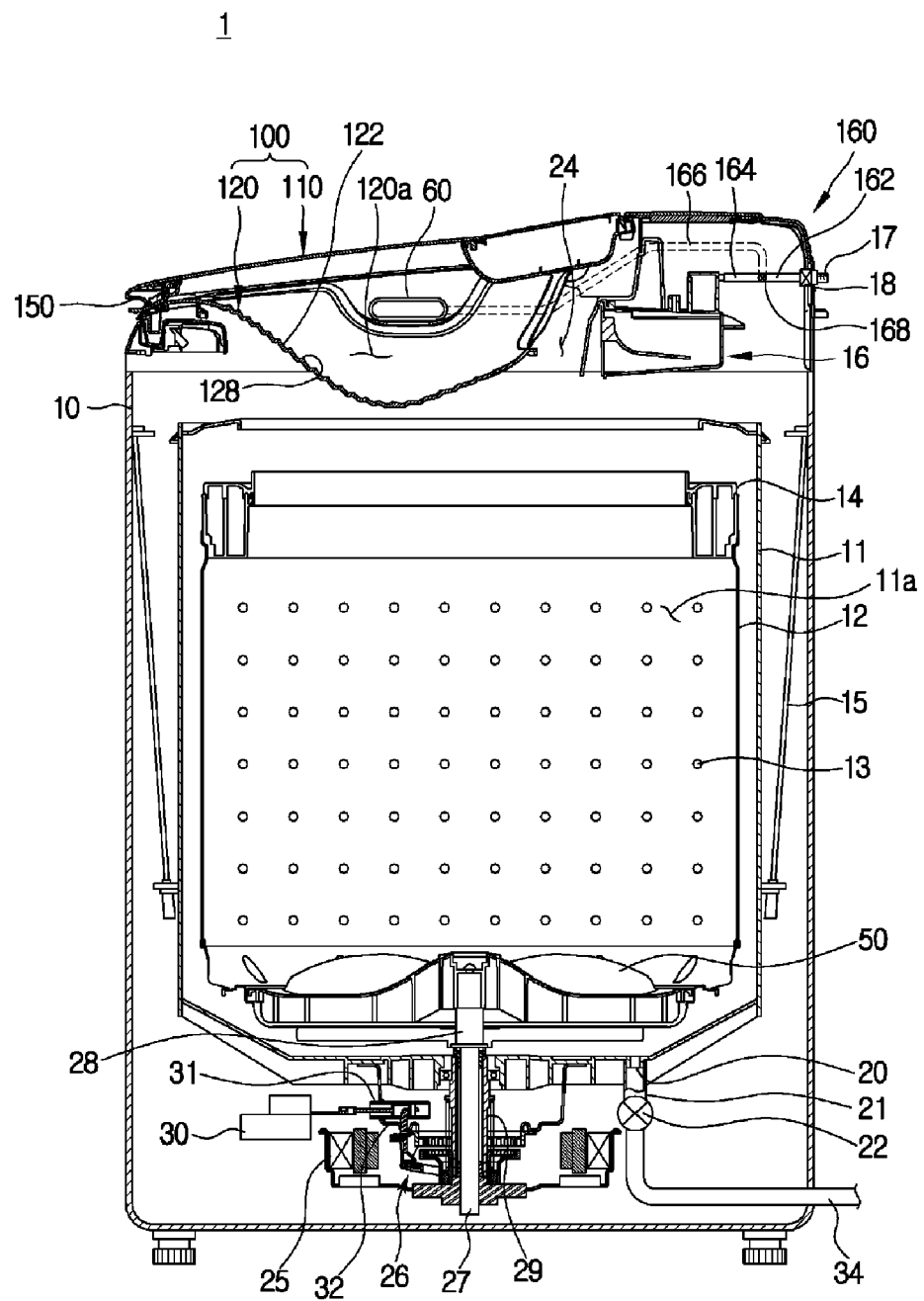

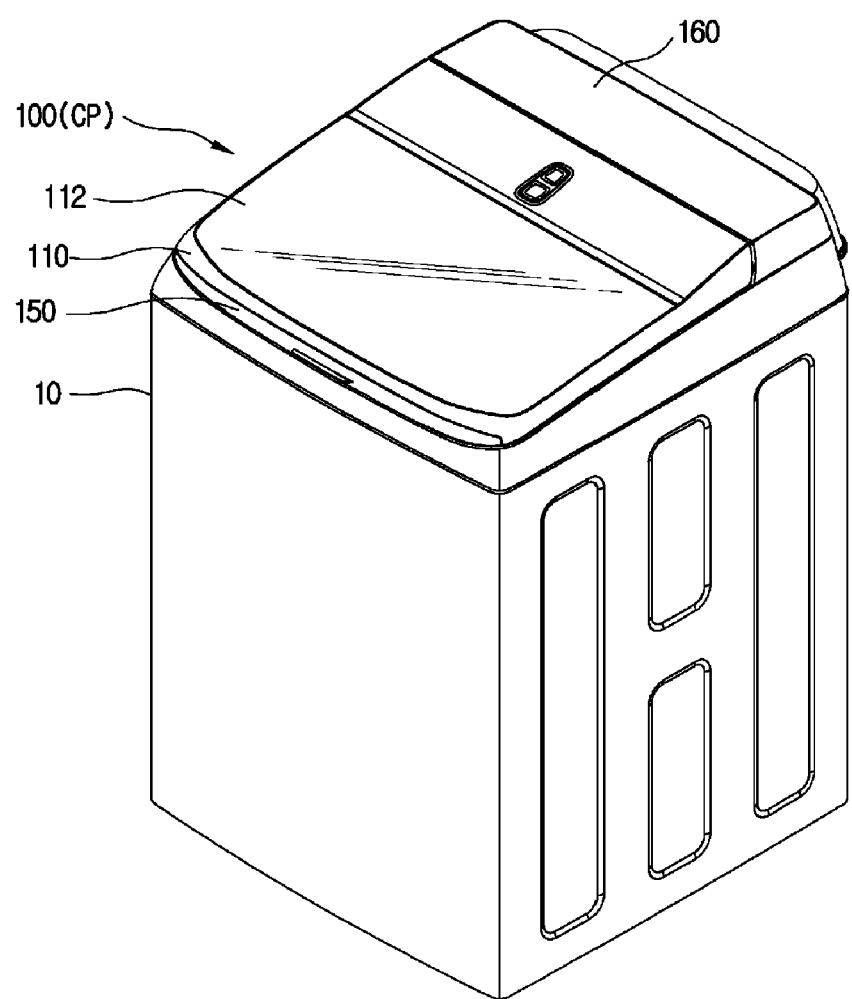
[Fig. 2]

[Fig. 3]
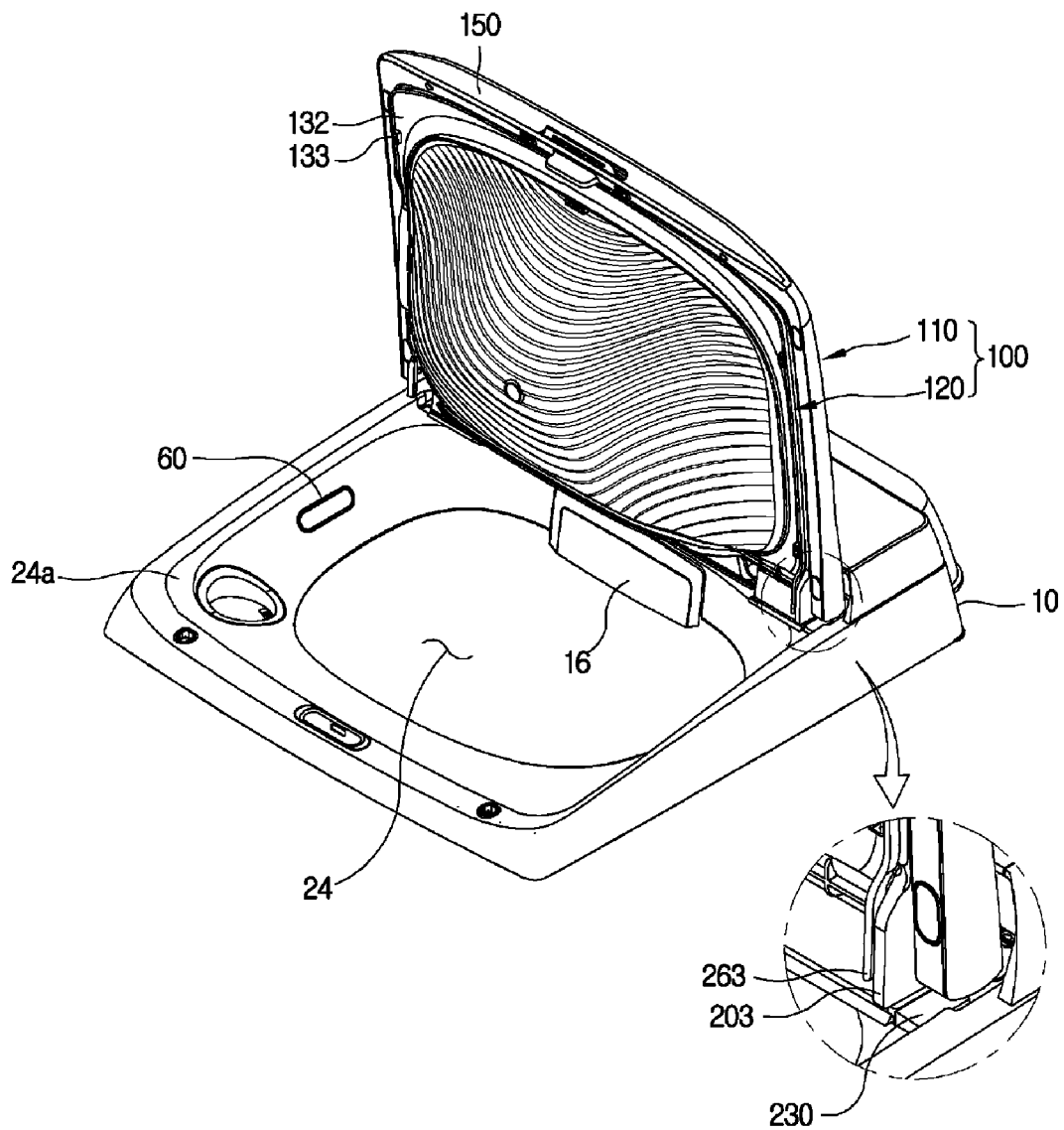

[Fig. 4]
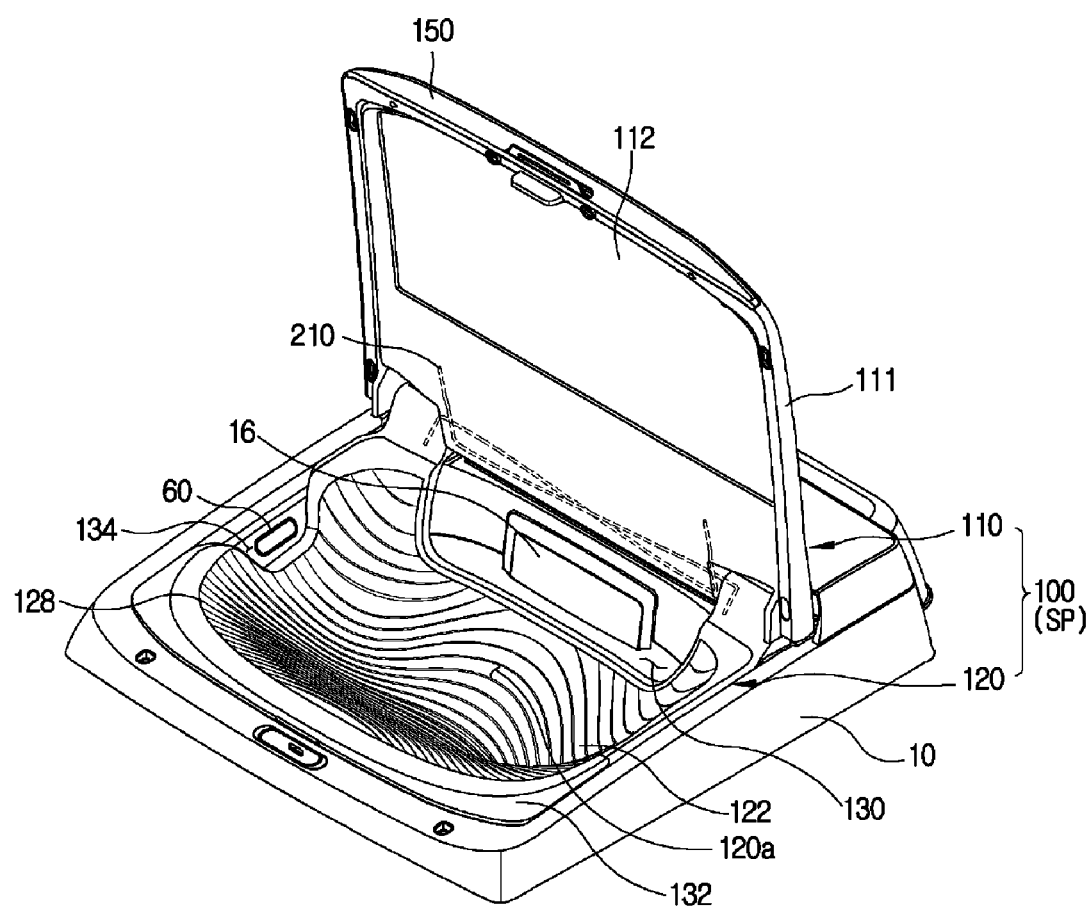

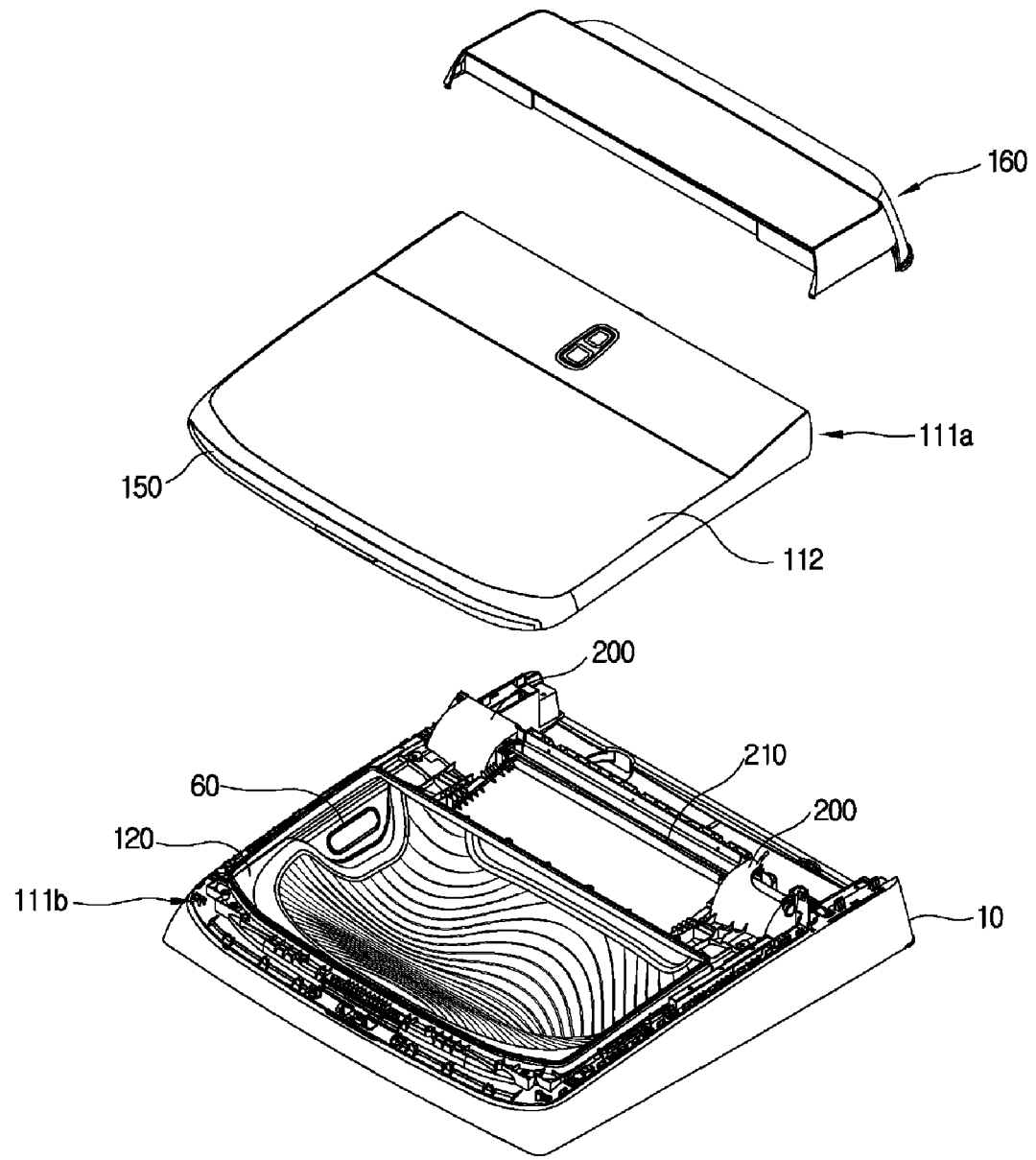
[Fig. 5]

[Fig. 6]
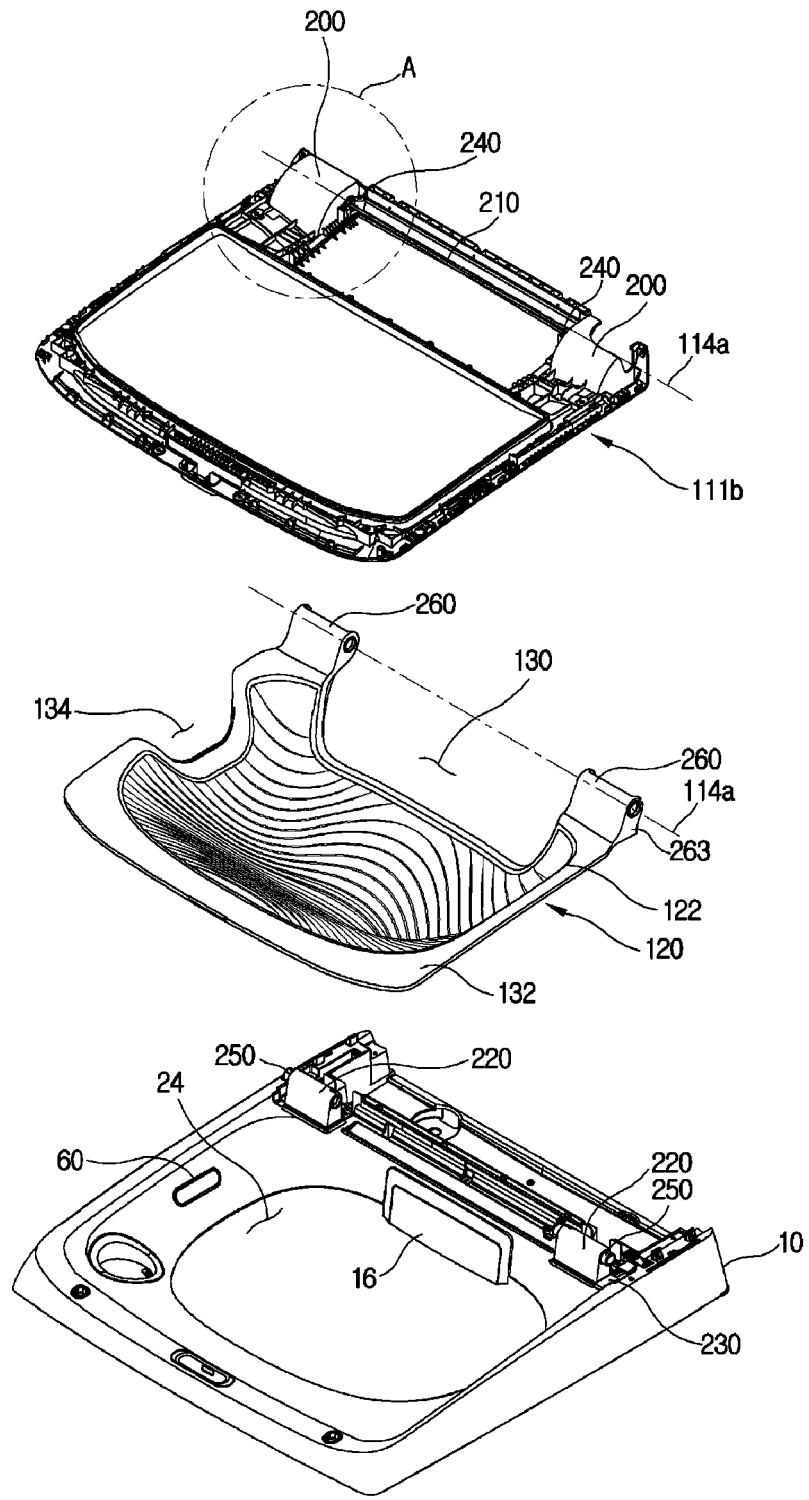

[Fig. 7]
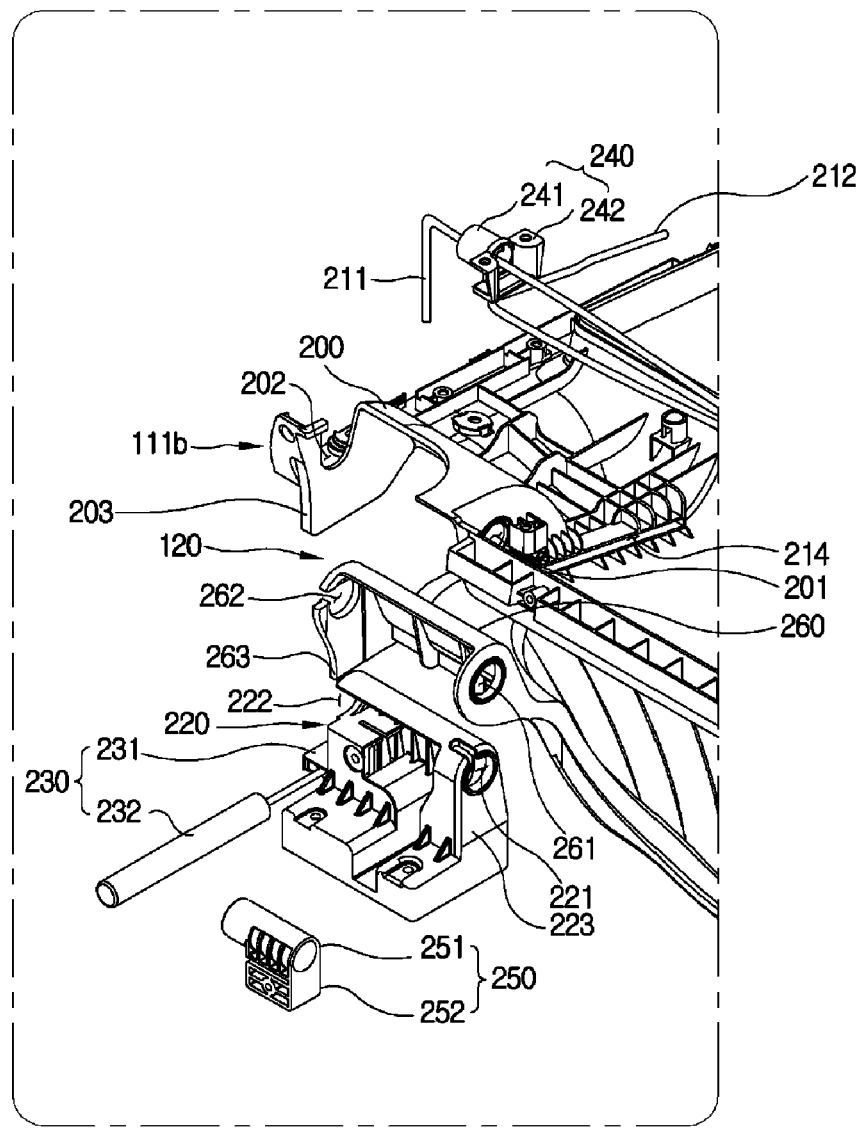

[Fig. 8]
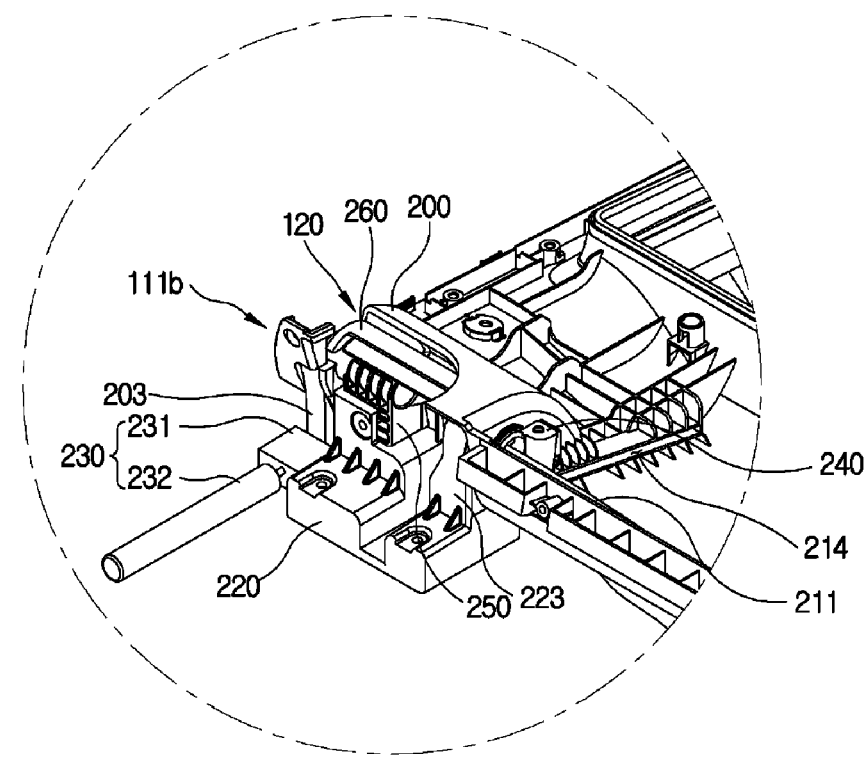
[Fig. 9]
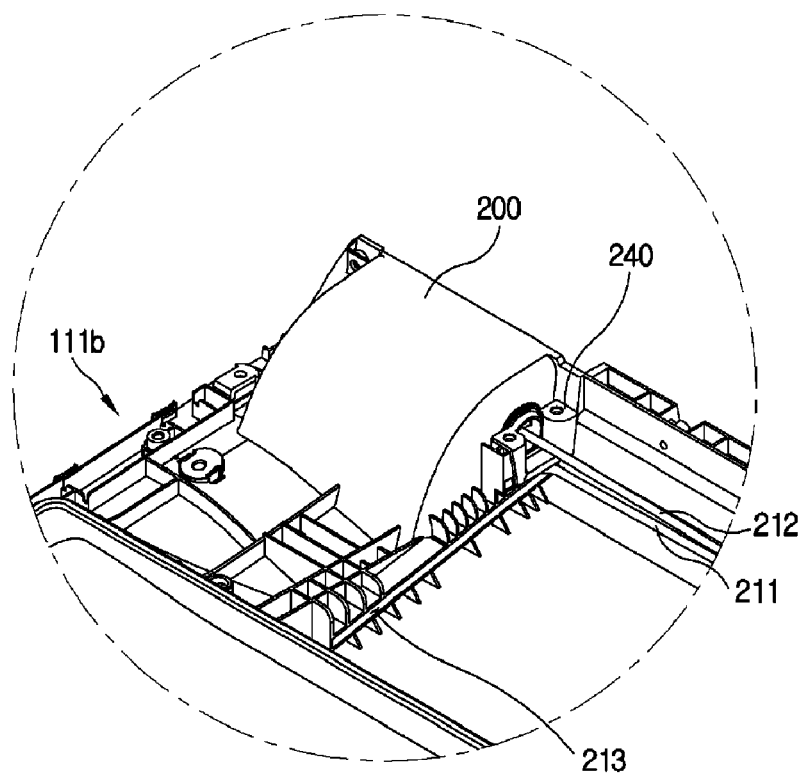

[Fig. 10]
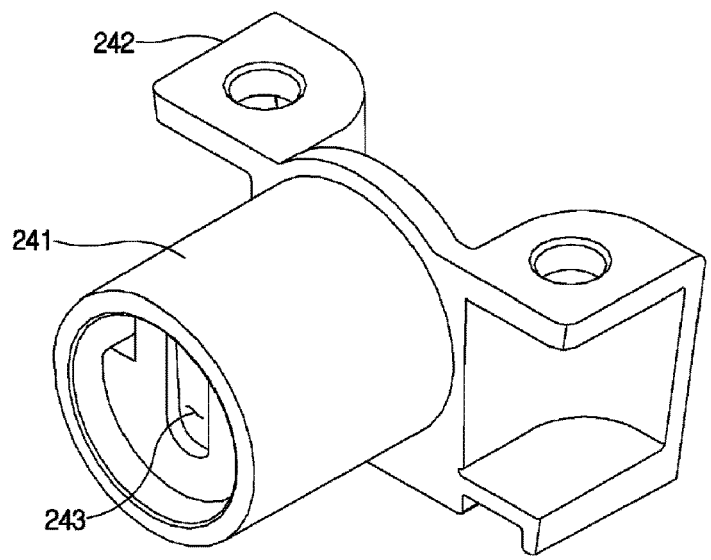
[Fig. 11]
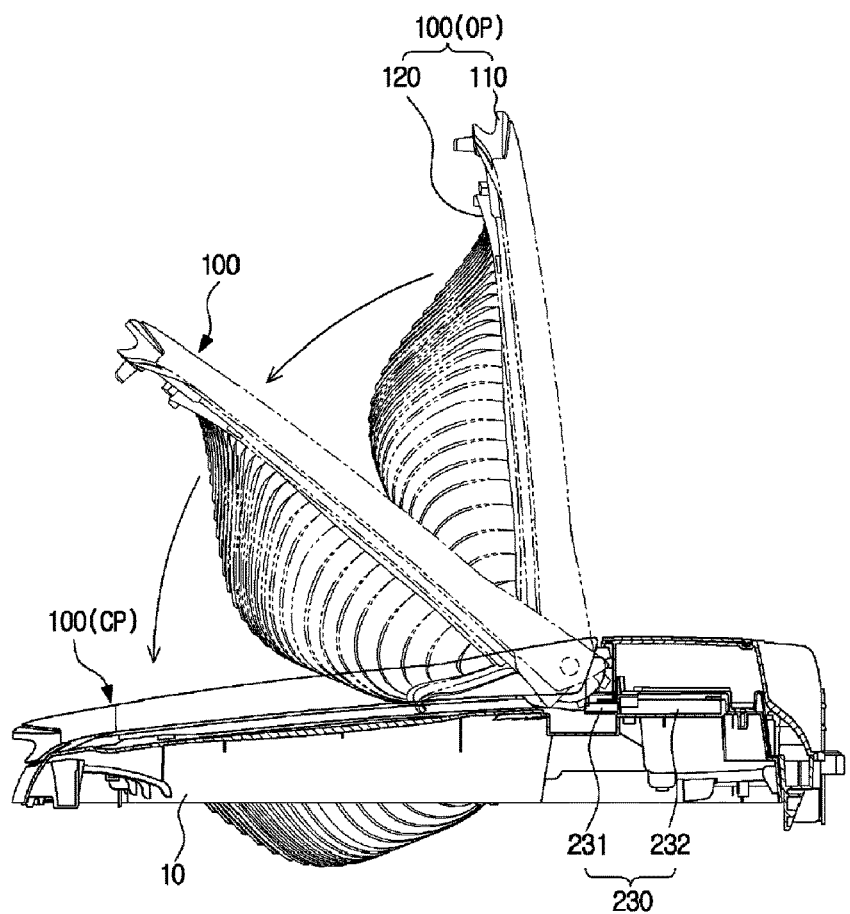

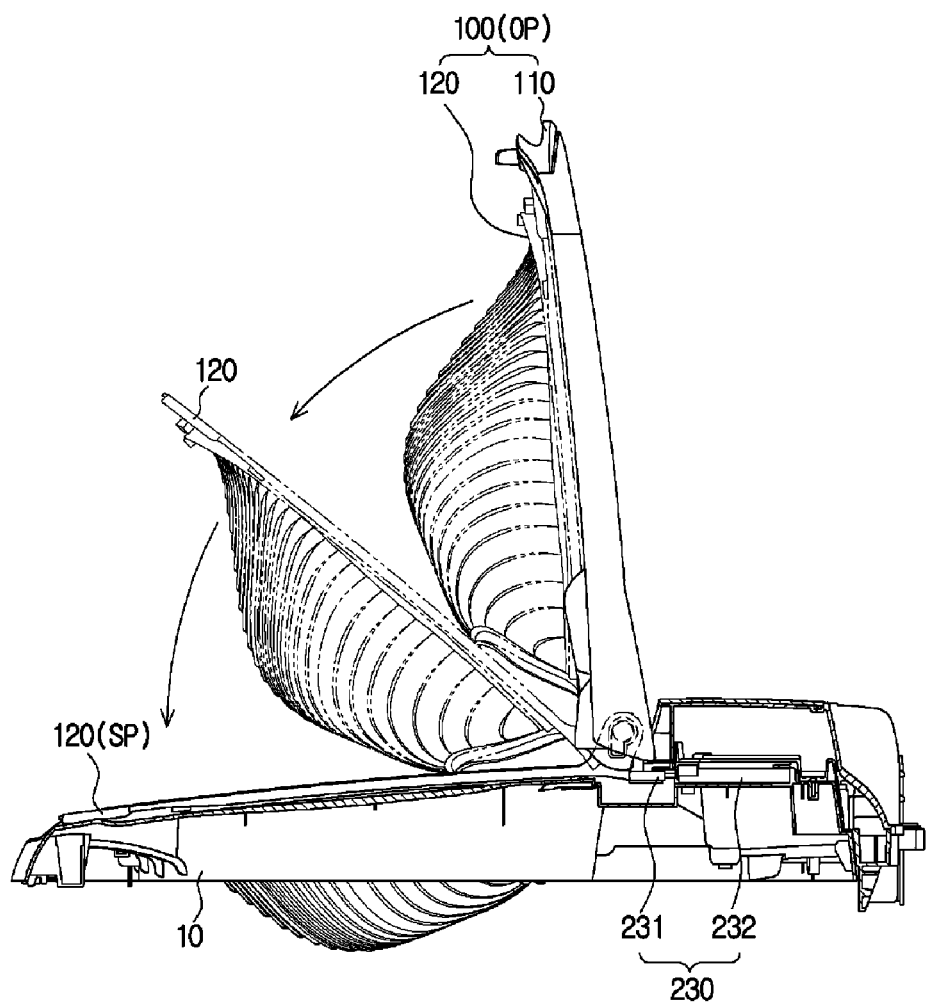
[Fig. 12]

[Fig. 13]
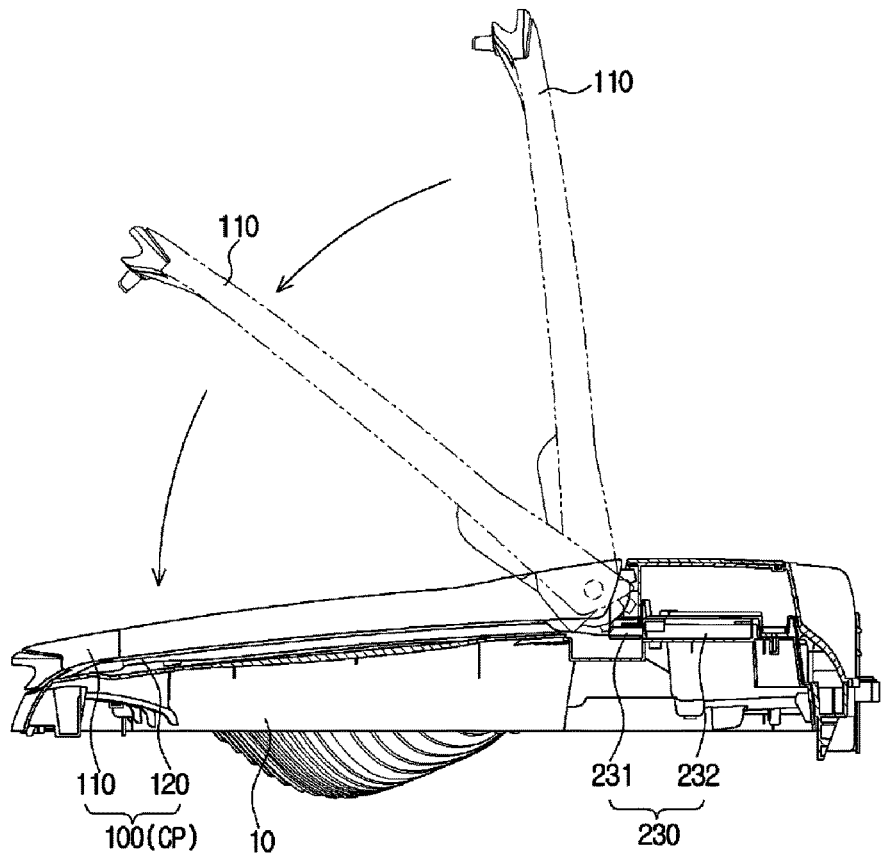
[Fig. 14a]
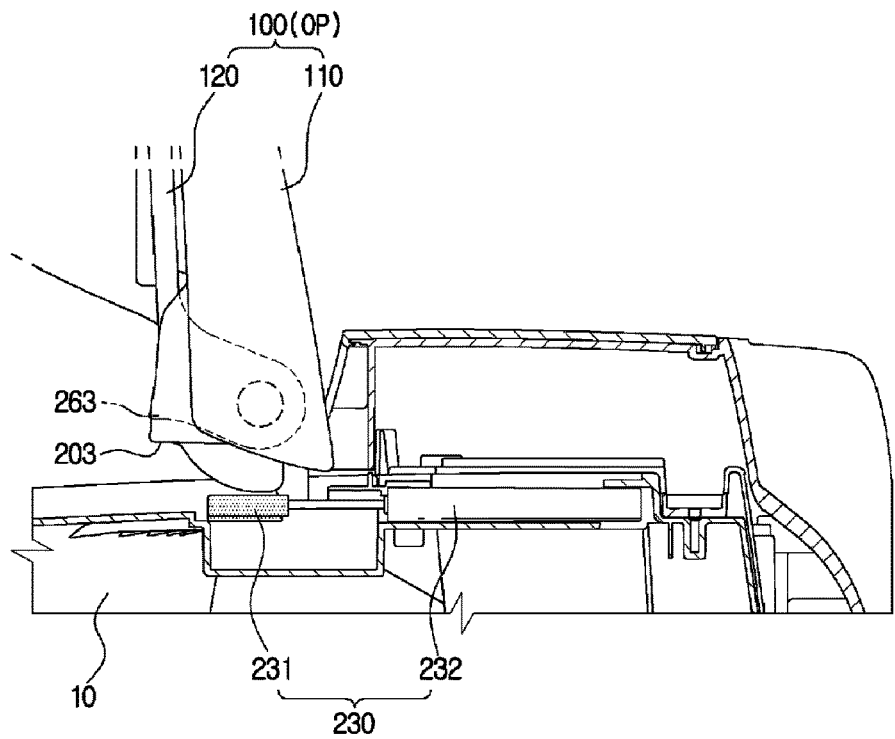

[Fig. 14b]
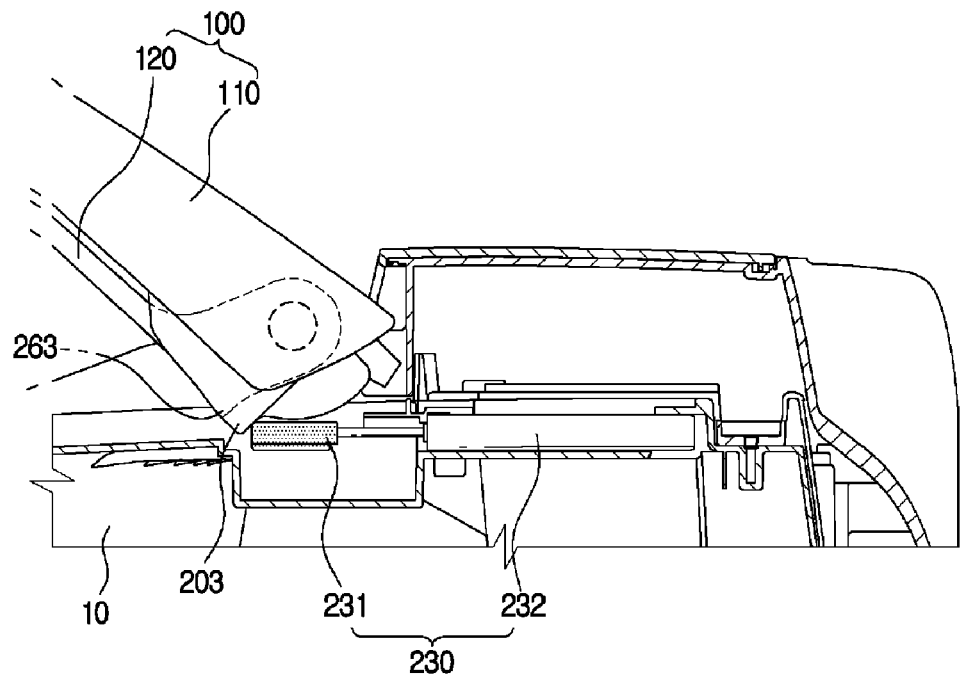
[Fig. 14c]
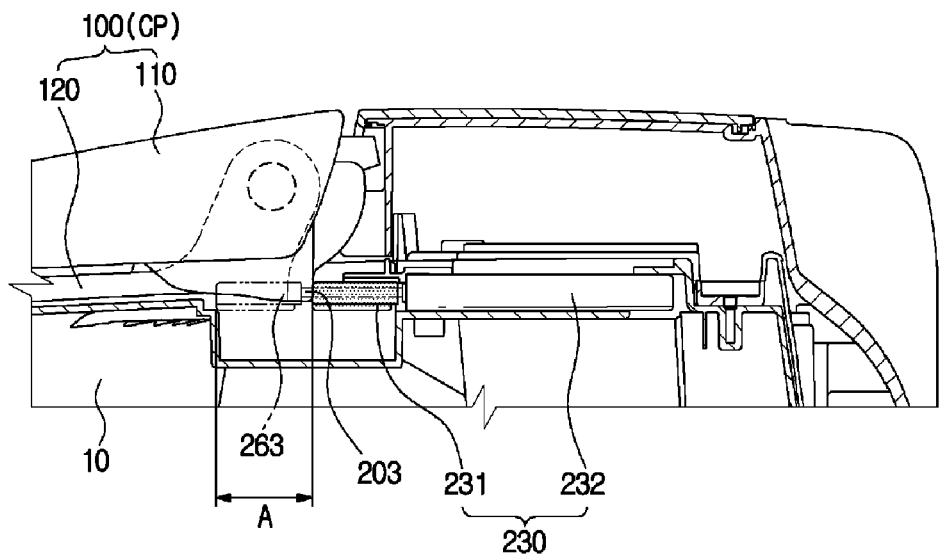

[Fig. 15a]
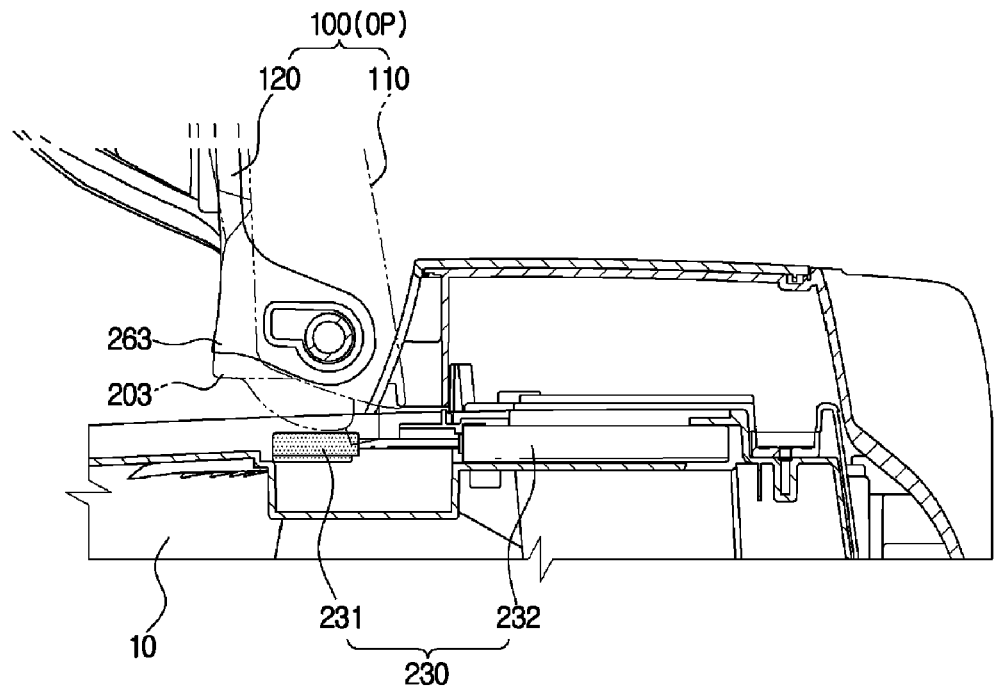
[Fig. 15b]
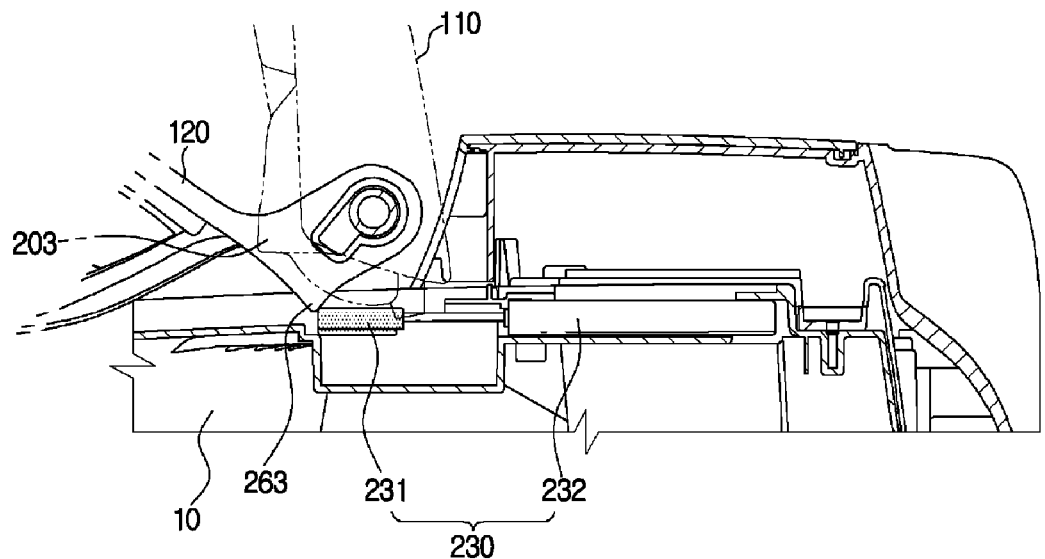

[Fig. 15c]
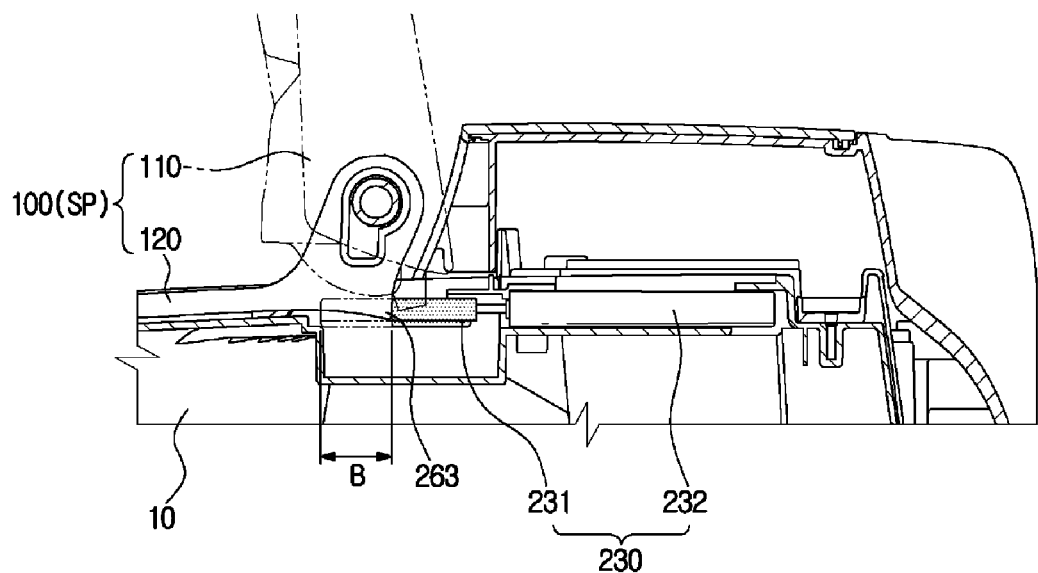
[Fig. 16a]
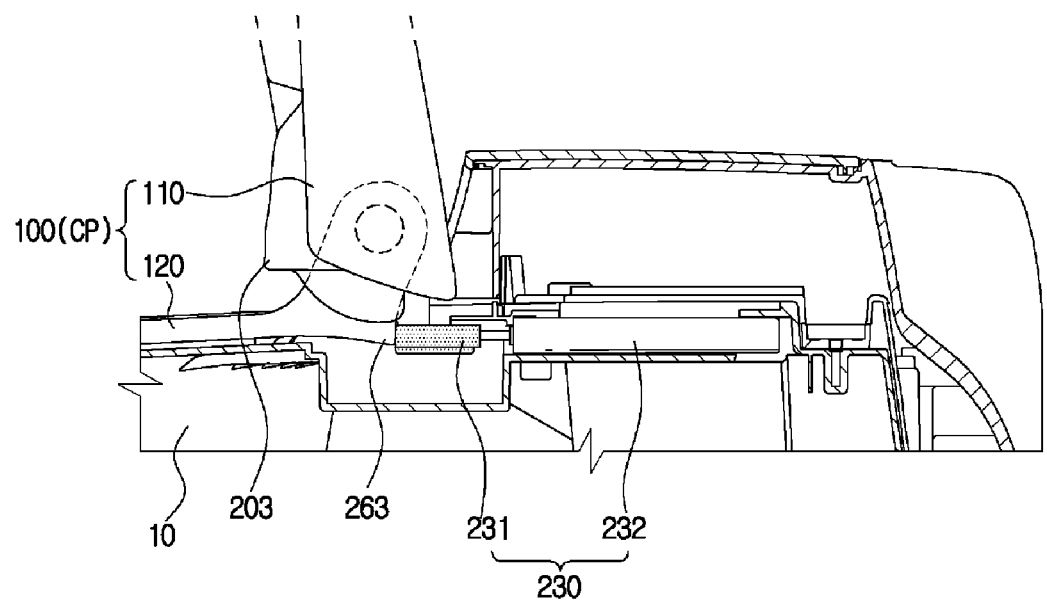

[Fig. 16b]
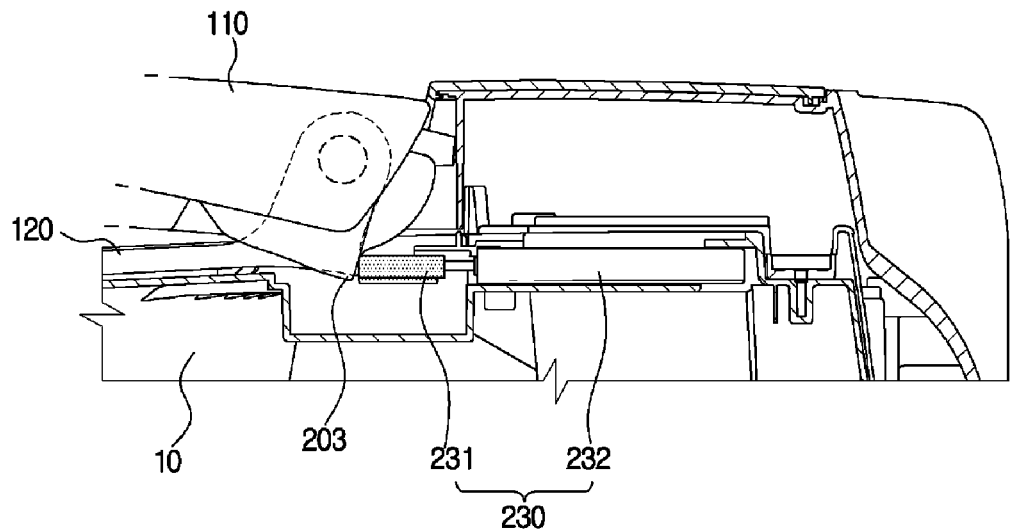
[Fig. 16c]
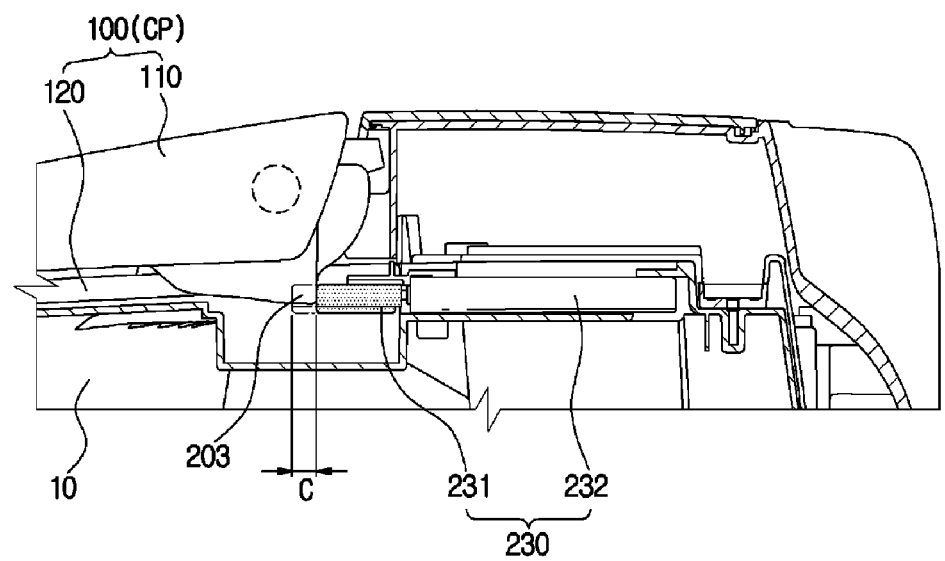

[Fig. 17]
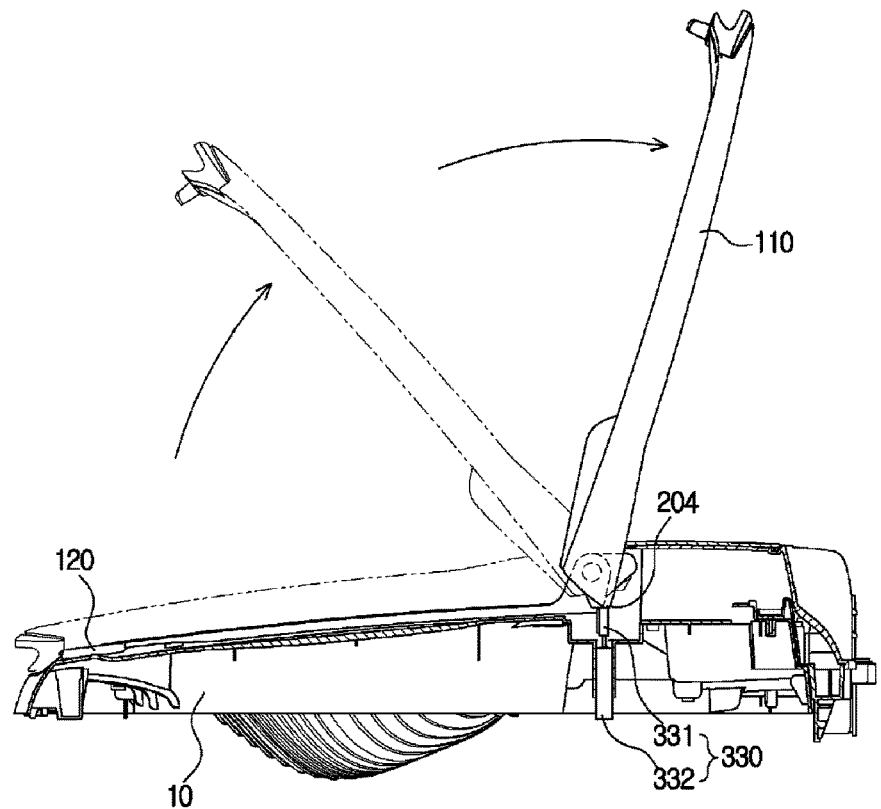
[Fig. 18]
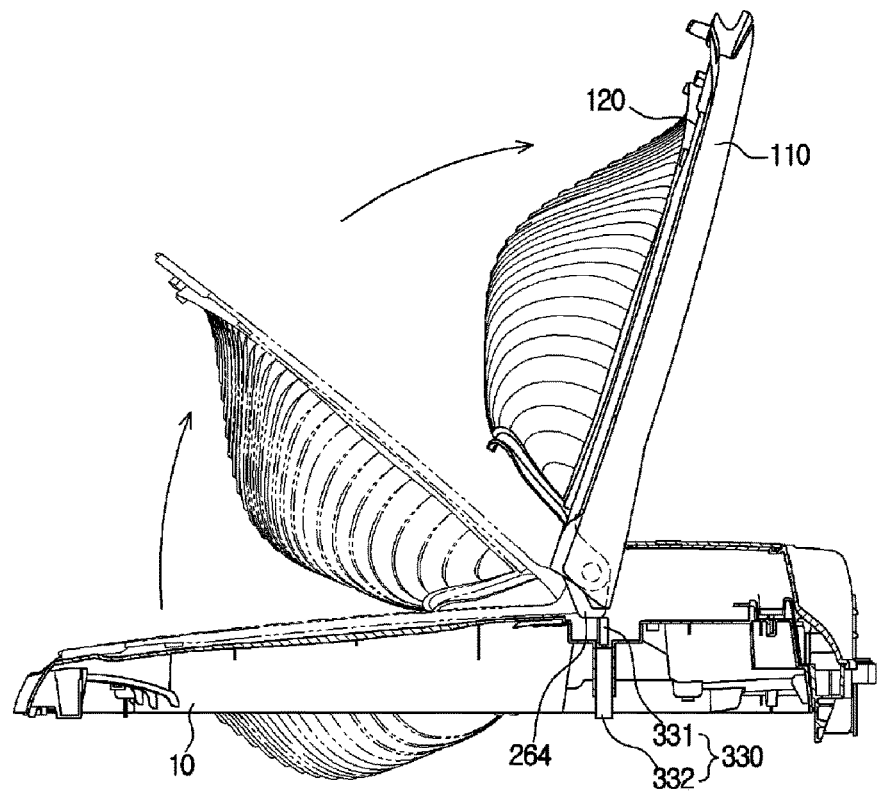

WASHING MACHINE AND HOME APPLIANCE

CROSS-REFERENCE TO RELATED APPLICATIONS

This application is a U.S. National Stage Application which claims the benefit under 35 U.S.C. § 371 of International Patent Application No. PCT/KR2016/015334, filed on Dec. 27, 2016, which claims the priority benefit of Korean Patent Application No. 10-2016-0000790, filed on Jan. 5, 2016 in the Korean Patent and Trademark Office, the disclosures of which are hereby incorporated by reference in their entirety.

TECHNICAL FIELD

The present disclosure relates to a washing machine and home appliance, and more particularly, to a washing machine and home appliance with a plurality of doors.

BACKGROUND ART

The present disclosure relates to a home appliance including an opening/closing device that may be configured with a plurality of doors, such as doors of a home bar installed in the door of a refrigerator, a bidet, a chest type refrigerator, etc. Especially, the present disclosure relates to a fully automatic washing machine configured with double doors, which has been recently released on the market.

A washing machine is a machine used to wash clothes with electric power, and generally includes a fixed tub containing cleaning water, a spinning tub installed to be rotated inside the fixed tub, and a pulsator arranged to rotate on the bottom of the spinning tub. The washing machine typically has a washing space formed by the fixed tub and spinning tub. With this structure, by changing currents of the cleaning water, laundry is washed.

The washing machine may be classified by washing method into agitator type, vortex type, and drum type washers. The agitator type washing machine performs washing by turning a laundry stick rising from the middle of a laundry tub left and right. The vortex type washing machine performs washing by using friction between laundry items and water currents produced by turning the pulsator in the shape of a disc formed on the bottom of the spinning tub left and right. The drum washing machine performs washing by putting water, detergent, and laundry items into a drum with multiple lifters protruding therefrom and spinning the drum.

Depending on the shape, washing machines may be classified into top-loading washing machines and front-loading washing machines. The top-loading washing machine allows laundry items to be put into the spinning tub through an opening equipped on the upper portion. The front-loading washing machine allows laundry items to be put into the spinning tub through an opening equipped on the side. In general, the agitator type washing machine and the vortex type washing machine are configured in the form of the top-loading washing machine, and the drum washing machine is configured in the form of the front-loading washing machine.

Meanwhile, old stains or local stains, for example, hardly come out by washing procedures of those washing machines. The washing machine generally has a washing space formed by the fixed tub and the spinning tub, but has no space for hand washing or extra washing. If the hand washing or extra washing is required, the user has to do the hand washing or extra washing in a separate location and then go back to the washing machine to do laundry. Extra water is also required to do hand washing or extra washing.

In a case where the hand washing or extra washing is available in a washing machine itself, no separate room is required and the water used in the hand or extra washing may be reused in a main washing procedure of the washing machine, thereby saving water.

In the case of top-loading washing machine, the door to open/close an opening formed on the top of the washing machine may be of a dual door type including an outer door and an inner door, and an extra washing space for hand washing may be provided on the inner door.

DISCLOSURE

Technical Problem

The present disclosure provides a structure of a home appliance with a plurality of doors, by which each door may be smoothly opened/shut.

The present disclosure provides a structure of a washing machine with an outer door and an inner door, by which the outer door and the inner door may be smoothly opened/shut.

Technical Solution

In accordance with one aspect to the present disclosure, a home appliance may include a main body with an opening; an outer door pivotally arranged in the main body; an inner door pivotally arranged between the opening and the outer door; and a damper configured to slow down pivoting speeds of the outer door and the inner door. The damper may include a moving member configured to move depending on angles of pivoting of the outer door and the inner door. The moving member may move as much as a first displacement when only the inner door pivots, and may move as much as a second displacement which is greater than the first displacement when the outer door and the inner door pivot together.

The moving member may move back and forth in a straight line.

The outer door and the inner door may pivot around the same pivot axis.

The moving member may move as much as a third displacement when only the outer door pivots, and the second displacement may be the sum of the first displacement and the third displacement.

The damper may be able to provide damping force to the inner door even after completion of providing damping force to the outer door.

The damper may be configured to provide damping force to the outer door and the inner door when the outer door and the inner door pivot in a direction to open the opening.

The outer door and the inner door may include a first pusher and a second pusher, respectively, configured to apply force to the damper. The first pusher and the second pusher may apply force to the damper when an extent of opening of the outer door and the inner door is equal to or greater than a certain angle.

The outer door and the inner door may be detachably combined to be able to simultaneously pivot together. The damper may be pressed by the second pusher of the inner door.

The damper may include a piston to be pressed by the outer door and the inner door and a cylinder fixed to the main body. The damper may leave a damping area in which the piston is able to move even while the inner door is closed. The outer door may press the damping area left.

The piston may pass a first damping area by closing operation of the inner door and may pass a second damping area by closing operation of the outer door.

The first damping area may have a longer length than the second damping area.

The piston continuously may pass the first damping area and the second damping area when the outer door and the inner door pivot simultaneously.

The outer door and the inner door may include a first pusher and a second pusher, respectively, configured to press the piston. The first pusher may be configured to protrude further toward the damper than the second pusher at a position at which the outer door and the inner door close the opening.

Advantageous Effects

According to embodiments of the present disclosure, each of a plurality of doors may be smoothly opened/shut in a home appliance.

According to embodiments of the present disclosure, outer door and inner door of a washing machine may be smoothly opened/shut.

The outer door may be smoothly closed after the inner door is smoothly closed, and the inner door may be smoothly opened after the outer door is smoothly opened. Furthermore, the outer door and the inner door may be combined and smoothly opened/closed together.

DESCRIPTION OF DRAWINGS

FIG. 1 is a cross-sectional view of a washing machine, according to an embodiment of the present disclosure;

FIG. 2 is a perspective view of a washing machine, according to an embodiment of the present disclosure;

FIG. 3 is a perspective view of an open door assembly of a washing machine, according to an embodiment of the present disclosure;

FIG. 4 is a perspective view of an inner door of a washing machine settled in place, according to an embodiment of the present disclosure;

FIG. 5 is an exploded view breaking down into a top frame of an outer door and a water supply part of a cabinet, according to an embodiment of the present disclosure;

FIG. 6 is an exploded view breaking down into a bottom frame of an outer door, an inner door, and a cabinet, according to an embodiment of the present disclosure;

FIG. 7 shows how to combine a bottom frame of an outer door, an inner door, and a door combiner of a cabinet, according to an embodiment of the present disclosure;

FIG. 8 shows a bottom frame of an outer door, an inner door, and a door combiner of a cabinet, which are combined together, according to an embodiment of the present disclosure;

FIG. 9 is an enlarged view of a part of a top frame of an outer door, according to an embodiment of the present disclosure;

FIG. 10 is a perspective view of a pivot pin unit, according to an embodiment of the present disclosure;

FIG. 11 shows closing operation of a door assembly, according to an embodiment of the present disclosure;

FIG. 12 shows closing operation of an inner door, according to an embodiment of the present disclosure;

FIG. 13 shows closing operation of an outer door, according to an embodiment of the present disclosure;

FIGS. 14A to 14C show damping operation of a damper due to closing operation of an inner door, according to an embodiment of the present disclosure;

FIGS. 15A to 15C show damping operation of a damper caused by closing operation of an outer door, according to an embodiment of the present disclosure;

FIGS. 16A to 16C show damping operation of a damper caused by closing operation of a door assembly, according to an embodiment of the present disclosure;

FIG. 17 shows opening operation of an outer door, according to an embodiment of the present disclosure; and FIG. 18 shows opening operation of an inner door, according to an embodiment of the present disclosure.

MODES OF THE INVENTION

Embodiments and features as described and illustrated in the present disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

Reference will now be made in detail to embodiments, examples of which are illustrated in the accompanying drawings, wherein like reference numerals refer to the like elements throughout. While a washing machine having an opening formed on the top is described in an embodiment, the present disclosure may be applied to all home appliances including a plurality of doors. Furthermore, it may be applied not only to a plurality of doors to be opened and closed by pivoting up and down but also to a plurality of doors to be opened and closed by pivoting left and right.

The main body of a home appliance may correspond to the cabinet of a washing machine, and a plurality of doors including first and second doors may correspond to a door assembly of a washing machine including an outer door and an inner door.

FIG. 1 is a cross-sectional view of a washing machine, according to an embodiment of the present disclosure.

Referring to FIG. 1, a washing machine 1 may include a cabinet 10 constituting the exterior, a fixed tub 11 placed inside the cabinet 10 to contain water, a spinning tub 12 rotationally placed inside the fixed tub 11, and a pulsator 50 arranged inside the spinning tub 12 to produce water currents.

An opening 24 is formed on the top of the cabinet 10 for allowing the user to put laundry items into the spinning tub 12. The opening 24 may be opened or shut by a door assembly 100 installed on the top of the cabinet 10. The fixed tub 11 may be supported by a suspension system 15 in the cabinet 10.

A water supply tube 17 is installed on the top of the fixed tub 11 to supply water into the fixed tub 11. One end of the water supply tube 17 is connected to an external water supply source and the other end of the water supply tube 17 is connected to a detergent supply unit 16. Water supplied through the water supply tube 17 passes through the detergent supply unit 16 and is supplied into the fixed tub 11 together with the detergent. A water supply valve 18 is installed in the water supply tube 17 to control water supply.

The spinning tub 12 may be shaped like a cylinder with the top open and the sides with a number of dehydration holes formed thereon. A balancer 14 may be equipped on the top of the spinning tub 12 to help the spinning tub 12 stably spin at high speed.

Outside of a lower part of the fixed tub 11, a motor 25 for producing a driving force to spin the spinning tub 12 and the pulsator 50, and an energy converter 26 for delivering the driving force produced by the motor 25 to the spinning tub 12 and the pulsator 50, simultaneously or selectively are installed.

The spinning tub 12 is combined with a dehydration shaft 29 with a cavity, and a washing shaft 27 installed in the cavity of the dehydration shaft 29 may be combined with the pulsator 50 by means of a washing shaft combiner 28. The motor 25 may deliver the driving force to the spinning tub 12 and the pulsator 50, simultaneously or selectively, according to the up/down operation of the energy converter 26.

The energy converter 26 may include an actuator 30 for producing driving force for energy conversion, a rod unit 31 that moves straight according to the operation of the actuator 30, and a clutch unit 32 coupled with the rod unit 31 for pivoting around with the movement of the rod unit 31.

On the bottom of the fixed tub 12, a drain hole 20 is formed to drain the water contained in the fixed tub 12, and the drain hole 20 is connected to a first drain tube 21. A drain valve 22 may be installed in the first drain tube 21 for controlling water drain. An outlet of the drain valve 22 may be connected to a second drain tube 34 for draining water to the outside.

FIG. 2 is a perspective view of a washing machine, according to an embodiment of the present disclosure, FIG. 3 is a perspective view of an open door assembly of a washing machine, according to an embodiment of the present disclosure, and FIG. 4 is a perspective view of an inner door of washing machine settled in place, according to an embodiment of the present disclosure.

Referring to FIGS. 2 to 4, the door assembly 100 is arranged around the opening 24.

The door assembly 100 may include an outer door 110 and an inner door 120.

The outer door 110 may be arranged on one side of the cabinet to open/shut the opening 24. The outer door 110 is arranged to be able to pivot on a side of the opening 24 in order to open and close the opening 24. The outer door 110 may include a transparent member 112 to make the inside visible even while the outer door 110 shuts the opening 24. The transparent member 112 may be arranged in a top frame 111*a* of a door frame 111.

The inner door 120 may be formed to have a supplementary washing room 120*a* enabling extra hand washing. The supplementary washing room 120*a* is separated from a main washing room 11*a* formed by the fixed tub and spinning tub for the user to be able to do laundry.

The main washing room 11*a* and the supplementary washing room 120*a* are separated from each other, each providing an independent washing room. Furthermore, washing in the main washing room 11*a* and the supplementary washing room 120*a* may be performed separately or simultaneously.

The inner door 120 may be arranged to be able to pivot around one side under the outer door 110. In other words, the inner door 120 may be arranged to be able to pivot between the outer door 110 and the opening 24. The inner door 120 may be formed to have the same pivot axis as that of the outer door 110. Pivoting operation of the inner door 120 and the outer door 110 will be described later in detail.

The inner door 120 may include a unit body 122 that forms the supplementary washing room 120*a*.

The supplementary washing room 120*a* is formed to be substantially concave to receive cleaning water to allow extra washing.

The inner door 120 may include frictional projections 128.

The frictional projections 128 are formed on the unit body 122 to facilitate supplementary washing. The frictional projections 128 serve to increase friction with clothes while in hand washing to better remove stains from the clothes, and in an embodiment of the present disclosure, are formed to be more swollen from the inner face of the inner door 120 than neighboring areas. As in the embodiment of the present disclosure, a plurality of frictional projections 128 may be formed to be parallel with one another. However, the shapes and positions of the frictional projections 128 are not limited thereto.

The inner door 120 may include an auxiliary drain 130.

The auxiliary drain 130 may be formed to discharge the used water out of the supplementary washing room 120*a*. The auxiliary drain 130 may have the form of a hole with an extra opening/shutting member and be located on a side of the unit body 122 of the supplementary washing room 120*a*. The auxiliary drain 130 may be formed to discharge water contained in the supplementary washing room 120*a* with inclinations when the inner door 120 is pivoted.

The inner door 120 may include a settling flange 132.

The settling flange 132 may have the form of a flange formed along the edge of the top of the inner door 120, and be settled in the cabinet 10. In other words, the settling flange 132 may be formed in a flange shape along the top of the unit body 122.

In the cabinet 10, a settlement part 24*a* may be formed along the edge of the opening 24. The settling flange 132 may be formed to sit in the settlement part 24*a* in the right position. When the settling flange 132 sits in the settlement part 24*a* in the right position, the inner door 120 may be fixed in the cabinet 10.

A cushion part 133 may be arranged on the bottom of the inner door 120. For example, the cushion part 133 may be arranged on the bottom of the settling flange 132. The cushion part 133 may relieve the impact when the settling flange 132 is settled in the settlement part 24*a*, and may thus prevent the inner door 120 or the cabinet 10 from breaking or from making noise when the inner door 120 is settled in the cabinet 10.

Referring to FIGS. 1 to 4, the washing machine 1 in accordance with an embodiment of the present disclosure may include a water supply device 160 for supplying water to the main washing room 11a and the supplementary washing room 120a. The water supply device 160 may include a water supply tube 162, a main water supply tube 164, a supplementary water supply tube 166, and a conversion unit 168.

The water supply tube 162 may be connected to the water supply valve 18 at one end, and to the conversion unit 168 at the other end. The water supply tube 162 is formed to deliver the water supplied from the water supply valve 18 to the conversion unit 168.

The main water supply tube 164 may be arranged to supply water to the main washing room 11a. The main water supply tube 164 may be connected to the detergent supply unit 16 at one end and to the conversion unit 168 at the other end.

The supplementary water supply tube 166 may be arranged to supply water to the supplementary washing room 120a of the inner door 120. The supplementary water supply tube 166 may be connected to the supplementary water supply hole 60 at one end, and to the conversion unit 168 at the other end.

The conversion unit 168 may be arranged to selectively supply the water delivered from the water supply tube 162 to one of the main water supply tube 164 and the supplementary water supply tube 166. Specifically, water is supplied into the washing room through at least one of the main water supply tube 164 and the supplementary water supply tube 166 by controlling the conversion unit 168. The conversion unit 168 may include a three-way valve.

In an embodiment of the present disclosure, the main water supply tube 164 and the supplementary water supply tube 166 may be branched from the water supply tube 162 with the conversion unit 168 in between. Alternatively, the main water supply tube 164 and the supplementary water supply tube 166 may be connected to the water supply valve 18 and may receive water by controlling the water supply valve 18. That is, the main water supply tube 164 connected to the detergent supply unit 16 at one end, and the supplementary water supply tube 166 connected to the supplementary water supply hole 60 at one end may be connected to the water supply valve 18 at their respective other ends.

In an embodiment of the present disclosure, water is selectively supplied to one of the main water supply tube 164 and the supplementary water supply tube 166. However, it is also possible to supply water to the main water supply tube 164 and the supplementary water supply tube 166 at the same time. Furthermore, regardless of whether the opening 24 is opened or shut by the inner door 120, water may be supplied through the supplementary water supply tube 166. If the inner door 120 shuts the opening 24, the water supplied through the supplementary water supply tube 166 may be contained on the inner door 120. Even if the inner door 120 opens the opening 24, the user may enable water to be supplied through the supplementary water supply tube 166 to wash clothes, his/her hands, or the like.

The supplementary water supply hole 60 may be formed to be linked with the supplementary water supply tube 166. The supplementary water supply hole 60 may be formed on one side of the inner door 120 so as to supply water to the inner door 120.

In order for the water supplied from the supplementary water supply hole 60 to flow into the inner door 120, a water inlet 134 is formed in the inner door 120 to correspond to the supplementary water supply hole 60. The water inlet 134 may be formed in a part formed to be concave from the top of the unit body 122. The water inlet 134 is, however, not limited to the shape, but may be of any shape that allows water to flow into the supplementary washing room 120a without being interfered by the unit body 122.

The inner door 120 may be formed of a thermoplastic resin. Alternatively, the inner door 120 may be made of an ABS material. However, the inner door 120 is not limited thereto, but may be made of any material that has enough impact resistance and rigidity to do hand washing.

The outer door 110 and the inner door 120 may be referred to as a main door 110 and a hand washing container 120, respectively, or a first door 110 and a second door 120, respectively.

Furthermore, although not shown, the washing machine 1 may further include one or more other doors in addition to the first door 110 and the second door 120, and the plurality of doors including the first door 110 and the second door 120 may be detachably combined together.

FIG. 5 is an exploded view breaking down into a top frame of an outer door and a water supply part of a cabinet, according to an embodiment of the present disclosure, FIG. 6 is an exploded view breaking down into a bottom frame of an outer door, an inner door, and a cabinet, according to an embodiment of the present disclosure, FIG. 7 shows how to combine a bottom frame of an outer door, an inner door, and a door combiner of a cabinet, according to an embodiment of the present disclosure, FIG. 8 shows a bottom frame of an outer door, an inner door, and a door combiner of a cabinet, which are combined together, according to an embodiment of the present disclosure, FIG. 9 is an enlarged view of part A of the top frame of the outer door shown in FIG. 6, and FIG. 10 is a perspective view of a pivot pin unit, according to an embodiment of the present disclosure. The outer door 110 and the inner door 120 are each mounted to be able to pivot on the cabinet 10.

Referring to FIGS. 5 to 9, the outer door 110 may include the top frame 111a and the bottom frame 111b. The transparent member 112 and the handle unit 150 are mounted in the top frame 111a, and a hinge 200 through which the outer door 110 and the cabinet 10 are pivotally combined, and an elastic member 210 for providing resilient force in the direction in which the outer door 110 is opened may be mounted in the bottom frame 111b.

On the top of the cabinet 10, there may be the water supply device 160, a door combiner 220, and a damper 230. The outer door 110 and the inner door 120 may be pivotally combined with the door combiner 220.

The outer door 110 is mounted to be able to pivot around a door pivot axis 114a, and the inner door 120 is mounted to be able to pivot around a supplementary pivot axis 140a.

In an embodiment of the present disclosure, the door pivot axis 114a and the supplementary pivot axis 140a are arranged on the same side for the outer door 110 and the inner door 120 to be opened/shut in the same direction.

The door pivot axis 114a and the supplementary pivot axis 140a may be arranged on the same axis. In other words, the door pivot axis 114a and the supplementary pivot axis 140a may be set to correspond to each other.

For this, the outer door 110 and the inner door 120 may be pivotally combined with the door combiner 220 through a first pivot pin unit 240 and a second pivot pin unit 250.

The door combiner 220 may be combined with the top face of the cabinet 10 for the outer door 110 or the inner door 120 to be able to pivot around the door pivot axis 114a or the supplementary pivot axis 140a in the cabinet 10. Specifically, the door combiner 220 may be inserted into a hinge 200 mounted on the outer door 110. First pivot holes 221, 201 and second pivot holes 222, 202 through which the first pivot pin unit 240 and the second pivot pin unit 250 pass, respectively, may be formed in the door combiner 220 and the hinge 200, and the outer door 110 may be pivotally supported by the first and second pivot pin units 240 and 250 against the cabinet 10.

Furthermore, even in a supplementary pivot unit 260 of the inner door 120, the first and second pivot holes 261 and 262 may be formed for the first and second pivot pin units 240 and 250 to pass through. The supplementary pivot unit 260 is pivotally arranged by being inserted into the hinge 200 of the outer door 110 such that the door pivot axis 114a and the supplementary pivot axis 140a correspond to each other.

The first pivot pin unit 240 may include a first body 242, and a first pivot pin 241 extending from one side of the first body 242. The first pivot pin 241 may be inserted into the first pivot holes 201, 221, 261, and the first body 242 may be fixed to the inner side of the bottom door frame 111b.

The second pivot pin unit 250 may include a second pivot pin 251, and a second body 252 that supports the second pivot pin 251 and is fixed to the door combiner 220.

In order for the outer door 110 and the inner door 120 to be combined with the door combiner 220 of the cabinet 10, the first pivot pin 241 may be inserted from outside of the hinge 200 of the door to pass through the first pivot holes 201, 221, 261. The second pivot pin 251 may be inserted from inside of the door combiner 220 to pass through the second pivot holes 202, 222, 262.

When the first pivot pin 241 is inserted, the first body 242 may be fixed to the bottom door frame 111b, and when the second pivot pin 251 is inserted, the second body 252 may be fixed to the door combiner 220. Accordingly, the outer door 110 and the inner door 120 may be pivotally combined with the cabinet 10.

There are no limitations on the form or position in which the outer door 110 and the inner door 120 pivot as long as they enable the outer door 110 and the inner door 120 to pivot around the same axis to open/shut the opening 24.

The supplementary pivot unit 260 may be formed to protrude from the unit body 122 such that the supplementary pivot axis 140a is separated from the unit body 122. These features may increase a pivoting radius of the inner door 120 and prevent the unit body 122 from being interfered by the outer door 110 or the cabinet 10 while the inner door 120 is pivoting.

The elastic member 210 and the damper 230 of a washing machine in accordance with an embodiment of the present disclosure will now be described.

In conventional washing machines, a device to open/shut the door of the washing machine has many different types of parts and has a complicated structure, requiring many assembling processes. Moreover, the conventional hinge structure provides a function for the door to be automatically shut when the extent of opening of the door is less than a threshold angle and automatically opened when the extent of opening of the door is greater than the threshold angle. This hinge structure causes poor emotional quality in shutting the door, and is inefficient if the damper is added because expenses and assembling processes increase. Furthermore, even if the damper is added, the door may not be smoothly shut when the extent of opening of the door is small.

Meanwhile, the washing machine 1 according to the present disclosure may include the elastic member 210 that provides resilient force in a direction in which the outdoor 110 is opened. The elastic member 210 may serve to reduce weights of the outer door 110 or the door assembly 100 to prevent them from falling free under their weights in shutting the outer door 110 or the door assembly 100. The elastic member 210 may also provide resilience for the outer door 110 or the door assembly 100 to be easily opened in opening the outer door 110 or the door assembly 100.

The washing machine 1 according to an embodiment of the present disclosure may include the damper 230 for the door assembly 100 to be smoothly settled in the cabinet 10. In other words, the damper 230 may play a role in slowing down the pivoting speed of the outer door 110 and the inner door 120. The damper 230 may damp pivoting of the door assembly 100 when the extent of opening of the door assembly 100 is smaller than a certain angle. Accordingly, in the shutting operation of the door assembly 100, the door assembly 100 may pivot to an angle while being forced by the elastic member 210, and may then be smoothly shut until being completely settled in the cabinet 10 due to the damper 230 working after the door assembly 100 reaches an operation angle of the damper 230.

The damper 230 may damp not only the pivoting of the door assembly 100, but also pivoting of the inner door 120 when the extent of opening of the inner door 120 is smaller than a certain angle even in an occasion to separate the inner door 120 from the door assembly 100 and settle the inner door 120 in the cabinet 10, i.e., in an occasion when the opening 24 is shut by pivoting the inner door 120 separately from the outer door 110. Since the inner door 120 is generally lighter than the outer door 110, it may pivot in the similar way as the door assembly 100 is shut by the damper 230, even if the inner door 120 is falling under its weight without resilient force of the elastic member. Specifically, in the operation of settling the inner door 120 in the cabinet 10, the inner door 120 may pivot to an angle, and may smoothly fall until being completely settled in the cabinet 10 due to the damper 230 working after the inner door 120 reaches an operation angle of the damper 230. Furthermore, the damper 230 may allow the opening 24 to be easily opened by providing repulsive force in the case of raising the inner door 120.

Moreover, the damper 230 may damp pivoting of the outer door 110 when the extent of opening of the outer door 110 is smaller than a certain angle even in an occasion when the opening 24 is shut by pivoting the outer door 110 after the inner door 120 is separated from the door assembly 100 and pivots separately from the outer door 110. Pivoting operation of the outer door 110 and the inner door 120 and damping operation of the damper 230 will be described in detail later.

Referring to FIGS. 5 to 10, the elastic member 210 may be arranged inside the outer door 110. For the elastic member 210, a torsion bar 210 or a torsion spring (not shown) may be used.

In a case where the torsion spring is used for the elastic member, an end of the torsion spring is supported by the outer door 110 and the other end is supported by the cabinet 10, so the torsion spring may provide repulsive force against pivoting.

In a case where the torsion bar 210 is used for the elastic member, the torsion bar 210 may be arranged inside the door frame 111 to be located on the pivot shaft lines 114a, 140a of the outer door 110 and the inner door 120. The torsion bar 210 may include a first torsion bar 211 and a second torsion bar 212 arranged to symmetrically cross each other. Both ends of the torsion bar 210 are bent such that one end may be supported against the inside of the outer door 110 and the other end may be supported against the cabinet 10.

In the bottom door frame 111b, a first supporter 213 and a second supporter 214 to support one ends of the first and second torsion bars 211 and 212, respectively, may be arranged.

The other end of the torsion bar 210 supported against the cabinet 10 may be supported on the inside of the door combiner 220 of the cabinet 10 not to expose the torsion bar 230. Specifically, the other end of the torsion bar 210 may pass through a via hole 243 formed in the first pivot pin 241 of the first pivot pin unit 240 and be contained and supported in a torsion bar container 223 of the door combiner 220. The via hole 243 formed in the first pivot pin 241 of the first pivot pin unit 240 may have an oblong shape that elongates in one direction for the end of the torsion bar 210 to be easily inserted thereto. Moreover, an incision is made in an upper part of the first pivot hole 221 of the door combiner 220 to help the torsion bar 210 pass through the first pivot hole 221.

The damper 230 may be arranged in the door frame 111 to be adjacent to the door combiner 220. Furthermore, a plurality of dampers 230 may be symmetrically arranged with respect to a center line perpendicular to the pivot axes 114a, 140a of the door assembly 100. The damper 230 may include a moving member 231 that moves depending on the pivot angles of the outer door 110 and the inner door 120. The moving member 231 may move back and forth in a straight line.

A direct-operated oil damper including a piston 231 and a cylinder 232 may be used for the damper 230. That is, the moving member 231 may be formed as the piston 231. The piston 231 may be configured to be pressed by the outer door 110 or the inner door 120, and the cylinder 232 may be fixed to the cabinet 10. First and second pushers 203 and 263 may be arranged on the outer door 110 and the inner door 120, respectively, to apply force to the damper 230.

Pivoting operation of the outer door 110 and the inner door 120 and damping operation of the damper 230 of the washing machine configured as described above will now be described.

FIG. 11 shows closing operation of a door assembly, according to an embodiment of the present disclosure, FIG. 12 shows closing operation of an inner door, according to an embodiment of the present disclosure, and FIG. 13 shows closing operation of an outer door, according to an embodiment of the present disclosure. FIGS. 14A to 14C show damping operation of a damper caused by closing operation of an inner door, according to an embodiment of the present disclosure, FIGS. 15A to 14C show damping operation of a damper caused by closing operation of an outer door, according to an embodiment of the present disclosure, and FIGS. 16A to 16C show damping operation of a damper caused by closing operation of a door assembly, according to an embodiment of the present disclosure.

Referring to FIGS. 2 to 4, and FIGS. 11 to 16C, the door assembly 100 in accordance with an embodiment of the present disclosure may be located at closing position CP, supplementary washing position SP, or open position OP by the outer door 110 or the inner door 120 pivoting around the pivot axes 114a, 140a.

The closing position CP is a position at which the door assembly 100 shuts the opening 24 with the outer door 110 and the inner door 120 located on the opening 24. When the door assembly 100 is at the closing position CP, washing operation of the washing machine 1 may be performed.

The supplementary washing position SP is a position at which the outer door 110 is opened by pivoting around the door pivot axis 114a from the closing position CP of the door assembly 100 while the inner door 120 shuts the opening 24. While the door assembly 100 is at the supplementary washing position SP, the user may do supplementary washing on the inner door 120.

The open position OP is a position at which the door assembly 100 opens the opening 24 by pivoting around the rotation axes 114a, 140a. The outer door 110 or the inner door 120 may open the opening 24 by pivoting around the pivot shafts 114a, 140a from the closing position CP or from the supplementary washing position SP. While the door assembly 100 is at the open position OP, the user may put clothes into the main washing room 11a through the opening 24.

The door assembly 100 may be shifted among the closing position CP, the supplementary washing position SP, and the open position OP by the user's manipulation of the handle unit 150.

Referring to FIGS. 11, 14A to 14C, when the door assembly with the outer door 110 and the inner door 120 combined is pivoting, the first pusher 203 located on the outer door 110 may press the piston 231 of the damper 230 because the first pusher 203 on the outer door 110 protrudes further than the second pusher 263 located on the inner door 120.

The door assembly 100 may fall to some angle from the open position OP under its weight reduced by resilient force of the elastic member 210. Specifically, the door assembly 100 falls from the open position OP until the first pusher 203 of the outer door 110 reaches the piston 231 of the damper 230. When it is at the operation angle of the damper 230, the door assembly 100 opens the opening 24 by smoothly pivoting to the closing position CP while the first pusher 203 presses the piston 231 of the damper 230 across the entire damping area A.

Referring to FIGS. 12, 15A to 15C, when the inner door 120 separated from the door assembly 100 is pivoting, the second pusher 263 located on the inner door 120 may press the piston 231 of the damper 230. The inner door 120 falls to some angle from the open position OP under its own weight, and when reaching the operation angle of the damper 230, smoothly pivots up to the supplementary washing position SP and be settled in the cabinet 10.

The damper 230 may be configured to provide damping force to both the inner door 120 and the outer door 110 when the inner door 120 and the outer door 110 are closed separately.

Furthermore, the second pusher 263 of the inner door 120 may be formed to protrude toward the piston 231 of the damper 230 less than the first pusher 203 of the outer door 110. Accordingly, the length B the second pusher 263 presses the piston 232 from the supplementary washing position SP is shorter than the length A the first pusher 203 presses the piston 232 from the closing position CP. That is, the piston 231 is not pressed to the end of the cylinder 232 but pressed as long as the length corresponding to the first damping area B.

Referring to FIGS. 13, 16A to 16C, while the inner door 120 is closed, i.e., the outer door 110 is pivoting from the supplementary washing position SP, the first pusher 203 located on the outer door 110 may further press the piston of the damper 230, which has been pressed to a first step, as much as the length C corresponding to a second step.

The damper 230 leaves a damping area C in which the piston 231 may be able to move even while the inner door 120 is closed, and the outer door 110 may press the piston 231 in the damping area C left while pivoting. Specifically, the piston 231 of the damper 230 may pass the first damping area B according to the closing operation of the inner door 120 and pass the second damping area C according to the closing operation of the outer door 110.

Accordingly, the outer door 110 may fall to a certain angle under the weight of the door assembly 100 reduced by the resilient force of the elastic member 210 until the first pusher 203 reaches the piston 231 of the damper 230 from the open position OP, and if the angle reaches the operation angle of the second step of the damper 230, close the opening 24 by smoothly pivoting to the closing position CP.

Referring to FIGS. 14A to 16C, the first damping area B may be set to have a longer distance than the second damping area C. Furthermore, at the position CP at which the door assembly 100 closes the opening 24, the first pusher 203 of the outer door 110 is provided to protrude further than the second pusher 203 of the inner door 120. Accordingly, when the outer door 110 and the inner door 120 pivot simultaneously, i.e., when the door assembly 100 pivots, the piston 231 of the damper 230 continuously passes the first damping area B and the second damping area C by the first pusher 203 of the outer door 110.

In other words, when only the inner door 120 pivots, the moving member 231 moves as much as a first displacement B; when both the outer door 110 and the inner door 120 pivot together, the moving member 231 moves as much as a second displacement A that is greater than the first displacement B; when only the outer door 110 pivots, the moving member 231 moves as much as a third displacement C, the second displacement A being the sum of the first displacement B and the third displacement C.

In the meantime, since the first pusher 203 of the outer door 110 protrudes further at a position CP at which the door assembly 100 closes the opening 24 than the second pusher 263 of the inner door 120, an extent of opening of the outer door 110 at which the first pusher 203 starts to press the damper 230 is greater than an extent of opening of the inner door 120 at which the second pusher 263 starts to press the damper 230.

FIG. 17 shows opening operation of an outer door, according to an embodiment of the present disclosure, and FIG. 18 shows opening operation of an inner door, according to an embodiment of the present disclosure.

In opening the door assembly 100 having the outer door 110 and the inner door 120 combined together from the closing position CP, the door assembly 100 could be roughly opened due to its own weight and the resilience of the elastic member 210, which may degrade the emotional quality in using the washing machine.

Referring to FIGS. 17 and 18, the washing machine 1 in accordance with an embodiment of the present disclosure may include another damper 330 arranged to smoothly open the door assembly 100 in opening the door assembly 100. The damper 330 may have the form of a direct-operated oil damper including a piston 331 and a cylinder 332. Furthermore, third and fourth pushers 204 and 264 may be arranged respectively on the outer door 110 and the inner door 120 to apply force to the damper 330.

When the outer door 110 and the inner door 120 are separately opened, on the contrary to the closing operation, the outer door 110 pivots open first and then the inner door 120 pivots open. The damper 330 for damping the opening operation of the outer door 110 and the inner door 120 may also be compressed in multiple steps.

When the outer door 110 pivots separately from the inner door 120 and is opened up to a critical angle to which the outer door 110 can be opened by its own weight and the resilient force of the elastic member without external force, the third pusher 204 arranged on the outer door 110 presses the piston 331 of the damper 330 and the damper 330 starts providing damping force for the outer door 110 to be smoothly opened to the supplementary washing position SP.

When the inner door 120 pivots open while the outer door 110 is opened, i.e., at the supplementary washing position SP, the fourth pusher 264 of the inner door 120 may further press the piston 331 of the damper 330, which has been compressed to a first step, as much as the length corresponding to a second step because the fourth pusher 264 of the inner door 120 protrudes further than the third pusher 204 of the outer door 110.

Specifically, when the inner door 120 is opened by external force until the inner door 120 can be opened under its weight without external force, i.e., until a center of the weight of the inner door 120 passes into the opening direction, the inner door 120 pivots under its weight until the fourth pusher 264 reaches the piston 331 of the damper 330 and then the fourth pusher 264 presses the piston 331 of the damper 330. By the damping force provided by the damper 330 to the inner door 110, the inner door 120 may be smoothly opened to the opening position OP. In a case of opening the door assembly 100 with the outer door 110 and the inner door 120 combined, when the door assembly 100 is opened to a certain angle at which the door assembly 100 is opened by its weight and the resilient force of the elastic member 210 without external force, the fourth pusher 264 of the inner door 120 protruding further than the third pusher 204 acts on the damper 330 for the door assembly 100 to be smoothly opened to the opening position OP.

A washing machine in accordance with an embodiment of the present disclosure may include both the damper 230 shown in FIGS. 11 to 16C and the damper 330 shown in FIGS. 17 and 18. Furthermore, the outer door 110 may include both the pushers 203, 204 that can apply force to the first and second dampers 230 and 330, and the inner door 120 may include both the pushers 263, 264 that can apply force to the first and second dampers 230 and 330.

The door open/shut structure of the washing machine including the elastic member and the damper as described above may be applied for various types of doors of home appliances, such as mini bars of refrigerators, bidets, top-loading Kimchi fridges, etc.

The home appliance may include a main body with an opening and a plurality of doors pivotally arranged in the main body. The home appliance may also include a damper to buffer pivoting of the plurality of doors. The damper may be configured to be compressed in steps by respective pivoting of the plurality of doors.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

The invention claimed is:
1. A home appliance comprising:
a main body with an opening;
an outer door pivotally arranged in the main body;

an inner door pivotally arranged between the opening and the outer door; and a damper including a moving member, wherein the inner door is configured to pivot alone, from an open position of the inner door, over an angular distance, without causing the moving member to move, and thereafter pivot past the angular distance to cause the moving member to be pressed and thereby move as much as a first displacement to dampen a pivoting speed of the inner door, and the outer door is configured to pivot together with the inner door, from an open position of the outer door, over an angular distance, without causing the moving member to move, and thereafter pivot past the angular distance to cause the moving member to be pressed and thereby move as much as a second displacement, which is greater than the first displacement, to dampen a pivoting speed of the outer door.

2. The home appliance of claim 1, wherein the moving member moves back and forth in a straight line.

3. The home appliance of claim 1, wherein the outer door and the inner door pivot around the same pivot axis.

4. The home appliance of claim 1, wherein the outer door is configured to, with the inner door being at a closed position and the moving member having been moved by as much as the first displacement, pivot alone from the open position of the outer door, over the angular distance, without causing the moving member to move, and thereafter pivot past the angular distance to cause the moving member to be pressed and thereby move as much as a third displacement, and thereby dampen the pivoting speed of the outer door, and the second displacement is the sum of the first displacement and the third displacement.

5. The home appliance of claim 1, wherein the damper is configured to provide a damping force to the inner door even after completion of providing a damping force to the outer door.

6. The home appliance of claim 5, wherein the damper is configured to provide a damping force to the outer door and the inner door when the outer door and the inner door pivot in a direction to open the opening.

7. The home appliance of claim 1, wherein the outer door includes a first pusher, the inner door includes a second pusher, the second pusher is configured to apply a force to the damper to cause the moving member to be pressed when the inner door pivots alone, and the first pusher is configured to apply a force to the damper to cause the moving member to be pressed when the outer door pivots together with the inner door.

8. The home appliance of claim 7, wherein when the outer door pivots together with the inner door to move the moving member as much as the second displacement, the damper is pressed by the first pusher but not by the second pusher.

9. The home appliance of claim 1, wherein the damper comprises a cylinder, and the moving member is a piston that moves in the cylinder, the damper leaves a remaining damping area in the cylinder in which the piston is able to move while the inner door is at a closed position, and the outer door is configured to, with the inner door being at the closed position and the piston having been moved by as much as the first displacement, pivot alone to cause the piston to be pressed and thereby move in the remaining damping area.

10. The home appliance of claim 9, wherein the piston passes a first damping area in the cylinder by a closing operation of the inner door and passes a second damping area in the cylinder by a closing operation of the outer door.

11. The home appliance of claim 10, wherein the first damping area has a longer length than the second damping area.

12. The home appliance of claim 10, wherein the piston continuously passes the first damping area and the second damping area when the outer door and the inner door pivot simultaneously.

13. The home appliance of claim 10, wherein the outer door includes a first pusher, the inner door includes a second pusher, the second pusher applies a force to the damper to cause the piston to be pressed when the inner door pivots alone, the first pusher applies a force to the damper to cause the piston to be pressed when the outer door pivots together with the inner door, and the first pusher is configured to protrude further toward the damper than the second pusher at a position at which the outer door and the inner door close the opening.

14. A home appliance comprising:

a main body with an opening;

an outer door pivotally arranged in the main body;

an inner door pivotally arranged between the opening and the outer door; and a damper including a cylinder and a piston that moves in the cylinder, wherein the inner door is configured to pivot alone, from an open position of the inner door, over an angular distance, without pushing the piston, and thereafter pivot past the angular distance to push the piston to move in the cylinder by as much as a first displacement to dampen a pivoting speed of the inner door, and the outer door is configured to pivot together with the inner door, from an open position of the outer door, over an angular distance, without pushing the piston, and thereafter pivot past the angular distance to push the piston to move in the cylinder by as much as a second displacement, which is greater than the first displacement, to dampen a pivoting speed of the outer door.

15. The home appliance of claim 14, wherein the outer door is configured to, with the inner door being at a closed position and the piston having been moved by as much as the first displacement, pivot alone from the open position of the outer door, over the angular distance, without pushing the piston, and thereafter pivot past the angular distance to push the piston to move in the cylinder by as much as a third displacement, to thereby dampen the pivoting speed of the outer door, and the second displacement is the sum of the first displacement and the third displacement.

16. The home appliance of claim 14, wherein the piston passes a first damping area in the cylinder by a closing operation of the inner door and passes a second damping area in the cylinder, which is deeper in the cylinder than the first damping area, by a closing operation of the outer door.

17. The home appliance of claim 15, wherein the piston passes a first damping area in the cylinder by a closing operation of the inner door and passes a second damping area in the cylinder, which is deeper in the cylinder than the first damping area, by a closing operation of the outer door.

* * * * *